United States Patent
Bertorelle

(10) Patent No.: US 8,547,911 B2
(45) Date of Patent: Oct. 1, 2013

(54) METHOD AND SYSTEM FOR CHANNEL SCANNING IN A WIRELESS COMMUNICATIONS SYSTEM

(75) Inventor: Jérôme Bertorelle, Neuilly sur Seine (FR)

(73) Assignee: Sequans Communications, Puteaux (FR)

( * ) Notice: Subject to any disclaimer, the term of this patent is extended or adjusted under 35 U.S.C. 154(b) by 1046 days.

(21) Appl. No.: 12/469,425

(22) Filed: May 20, 2009

(65) Prior Publication Data

US 2009/0290552 A1  Nov. 26, 2009

(30) Foreign Application Priority Data

May 21, 2008  (EP) .................................... 08156668

(51) Int. Cl.

| | | |
|---|---|---|
| H04W 4/00 | (2009.01) | |
| H04W 36/00 | (2009.01) | |
| H04J 11/00 | (2006.01) | |
| H04B 1/38 | (2006.01) | |
| H04L 27/00 | (2006.01) | |
| H04L 27/08 | (2006.01) | |

(52) U.S. Cl.
USPC ........... 370/329; 370/210; 455/436; 455/437; 375/222; 375/259; 375/345

(58) Field of Classification Search
USPC ................. 370/210, 208, 328; 375/260, 222, 375/345, 259
See application file for complete search history.

(56) References Cited

U.S. PATENT DOCUMENTS

| 6,370,188 B1 * | 4/2002 | Wu et al. ...................... 375/222 |
|---|---|---|
| 6,434,186 B2 | 8/2002 | Dowling |
| 6,714,605 B2 | 3/2004 | Sugar et al. |
| 2005/0286409 A1 * | 12/2005 | Yoon et al. ..................... 370/210 |
| 2007/0071114 A1 * | 3/2007 | Sanderford et al. .......... 375/259 |
| 2008/0049666 A1 * | 2/2008 | Golash et al. ................. 370/329 |
| 2008/0119186 A1 * | 5/2008 | Song et al. .................... 455/436 |
| 2008/0240032 A1 * | 10/2008 | Gelbman et al. .............. 370/329 |
| 2009/0275335 A1 * | 11/2009 | Jalloul et al. .................. 455/437 |
| 2010/0067615 A1 * | 3/2010 | Dorpinghaus et al. ........ 375/295 |
| 2010/0128826 A1 * | 5/2010 | Imamura et al. .............. 375/345 |

FOREIGN PATENT DOCUMENTS

WO  0031998 A1  6/2000

OTHER PUBLICATIONS

Paul Boone et al., "Strategies for Fast Scanning and Handovers in WiMAX/802.16", Aug. 1, 2007.
European Search report for corresponding European Application No. EP 08 156 668.9, filed May 21, 2008.

* cited by examiner

*Primary Examiner* — Ian N Moore
*Assistant Examiner* — Kiet Tang
(74) *Attorney, Agent, or Firm* — David D. Brush; Westman, Champlin & Kelly, P.A.

(57) ABSTRACT

A method is provided for channel scanning in a wireless communications system, for the identification of one or more narrow-band channels present in a certain frequency band and which can be used for connection between a wireless communications device and a communications network. The method includes: applying a FFT function to at least one signal corresponding to a given frequency band, providing for a set of coefficients each being representative of a frequency, analyzing the coefficients so as to detect at least one frequency region having at least one predetermined feature, and determining at least one channel position, by considering that each of the at least one frequency region having at least one predetermined feature is a guard band of one of the at least one channel.

14 Claims, 3 Drawing Sheets

METHOD AND SYSTEM FOR CHANNEL SCANNING IN A WIRELESS COMMUNICATIONS SYSTEM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

TECHNICAL FIELD OF THE DISCLOSURE

The disclosure relates generally to the field of wireless communications systems, and more particularly, to a channel scanning method and system for use in wireless communications equipments.

BACKGROUND

Channel scanning is a generally known technique used by mobile stations to find the communications channels that can be used to connect with a base station and therefore with a communications network. When a mobile station, such as a mobile phone, is powered on, it shall search an available channel for connection with the network. The same happens when the mobile phone loses connection to the network; it must find a usable channel as soon as possible to become connected again.

Generally, wireless communications systems have well-defined frequency bands and channel plans, which are also harmonized over many countries before a wireless communications standard is widely deployed. Moreover, a typical mobile station is pre-provisioned for a given operator, and is configured with the list of channels used by this operator as well as the channels plans for the main roaming partners of that operator. In this context, a mobile station trying to enter the network will typically use a gradual approach, for example, the mobile will first try the channel of its last serving base station, and if that fails, it will try to connect to the network by using any one channel of a set of channels whose configuration (frequency and bandwidth) has been previously defined and stored in the mobile station. If the mobile station cannot connect to the network using a certain channel configuration of the set, it will try with another channel configuration of that set, and so on, in a trial and error search approach until it finds the channel configuration available in that location for connection to the network.

However, the channel search can require a significant amount of time, particularly if the number of channels of the set to be searched is large. This delays the network connection time and degrades the communications service experience. Indeed, users will find objectionable to wait a long time after turning on a mobile station before obtaining a channel and being able to start communication.

Therefore, there is a need to find a solution to the above problem, and reduce the time a mobile station needs to find a suitable channel to connect to the network. A known solution, for example, is disclosed in U.S. Pat. No. 6,434,186, where the mobile station is provided with a certain channel plan or Preferred Roaming List, i.e. a set of predetermined channels (defined by their center frequency and bandwidth) the mobile station may use to connect with the network, but, instead of trying to connect to the network using each channel of the set, the mobile station first performs a spectral analysis of each channel of the set in order to recognize whether each channel contains a signal of a certain wireless communication technology (e.g. A CDMA signal) or not. Then that information is used to determine which channels of the set are more likely to be CDMA channels, and to search these channels first (i.e., with a higher priority), or to only search these channels. The number of attempts for connection to the network is thereby reduced and consequently also the connection time.

Another known solution is disclosed in U.S. Pat. No. 6,434,186, in which the mobile station is provided with a certain channel plan, but, instead of trying to connect to the network using each channel of the set, the mobile station first uses a wide bandwidth reception mode in order to detect wide bandwidth segments which contain a significant signal energy (e.g. said segments are prioritized according to the signal strength detected) and then using a narrowband reception mode to detect the channels of each wide bandwidth that contain the strongest signal. According to this approach, each channel of the set is prioritized by signal strength and attempts to connect with the network are first done with those channels with higher priority (the ones containing the strongest signal).

Nevertheless, while the above solutions reduce the network connection time by prioritizing the channels for which a connection attempt shall be done, they still rely on a certain pre-provisioned channel list stored in the mobile station. This may be suitable for 2G and certain 3G wireless communications standards for which the pre-provisional channel list can be maintained within a certain complexity limit, but will not be suitable for certain standards, e.g. WiMAX or 3GPP LTE, in which the number of possible channel configurations to test increases significantly. For WIMAX, for example, the diversity of channel configurations may substantially vary from operator to operator and from country to country, and many configurations can be used by the operators concerning channel bandwidth (e.g. 3, 3.5, 5, 7, 8.75 and/or 10 MHz) and the frequency bands to be used by the wireless communication devices (e.g. 700 MHz, 1.6 GHz, 2.3 GHz, 2.5 GHz and/or 3.5 GHz). For each frequency band a trial and error approach would need several connection attempts and the wireless communications equipment may, for example, need to search channels in at least a 600 MHz bandwidth. Additionally, many wireless communication devices may be sold without being pre-provisioned with a list of possible channels which can be used to connect with the network.

Still another known solution, which is considered the closes state of the art, is disclosed in U.S. Pat. No. 6,714,605, in which a real-time spectrum analysis engine (SAGE) is provided to generate information about the signal activity in a frequency band. The SAGE comprises a spectrum analyzer component, which generates data representing a real-time spectrogram of a bandwidth radio frequency spectrum, and a signal detector component, which detects signal pulses in a frequency band and outputs pulse event information. The signal detector comprises a peak detector, which detects one or more peaks in a spectral information of a frequency band and a pulse detector, which, for each detected peak, determines whether it is a signal pulse that satisfies one or more characteristics.

However, the peak detection techniques used in the above-cited document are not able to perfectly identify and characterize all the communications channels of a frequency band since they do not take in consideration the different frequency representation of channels from different communications standards. Indeed, signal detection and characterization is done, on the other hand, based on pre-provisioned pulse detection rules which depend on the frequency band analyzed. The solution, therefore does not adapt to certain communications standards in which the diversity of channel configurations may substantially vary from operator to operator and from country to country, since the pre-provisioned pulse detection rules to be applied and tested would increase the complexity of identifying the channel characteristics. The solution does not adapt either for channel scanning in frequency bands with at least 600 MHz of bandwidth.

SUMMARY

According to a first aspect of the disclosure, the method for channel scanning in a wireless communications system, for the identification of one or more narrow-band channels present in a certain frequency band and which can be used for connection between a wireless communications device and a communications network, comprises applying a FFT function to at least one signal corresponding to a given frequency band, providing for a set of coefficients each being representative of a frequency, analyzing said coefficients so as to detect at least one frequency region having at least one predetermined feature, and determining at least one channel position, by considering that each of said at least one frequency region having at least one predetermined feature is a guard band of one of said at least one channel.

The channel scanning method and system of an illustrative embodiment of the disclosure does not rely on any pre-stored channel plan information. It is therefore well suited for the discovery of the channels being used in a certain frequency band and the identification of the main characteristics of said channels, such as the channel bandwidth, channel center frequency and channel average power. With this information the wireless communication device may initiate a conventional trial and error search approach using only those identified channels. When the wireless communications device needs to perform a complete channel scanning of a certain frequency band, the method and system of an illustrative embodiment of the disclosure advantageously reduces the time to find a suitable channel for connecting to the network by reducing the number of channel combinations to test by trial and error. Additionally, by reducing the scanning time, the wireless communications device can spend more time in a power saving mode, which greatly improves the wireless communications device battery autonomy/recovery time ratio in out of reach conditions.

According to a specific embodiment the FFT function is configured to the maximum FFT-point size supported by the wireless communications device.

According to another specific embodiment, the wireless communications device performs a network connection attempt for at least one of the channels identified in said frequency band.

In one advantageous embodiment, the frequency band is divided into a plurality of frequency segments (or frequency windows) and the FFT function is applied to a plurality of input signals, each input signal having a bandwidth corresponding to one of said frequency segments (or frequency windows). For example, according to further specific embodiments, each frequency segment may have a bandwidth which is either a maximum channel bandwidth or a minimum channel bandwidth supported by the wireless communications device.

In another advantageous embodiment, the method further comprises normalizing the power values provided by the FFT function to a common reference.

According to still another embodiment, based on said determined guard bands, the method further comprises determining the bandwidth and a center frequency for each determined channel position.

In another specific embodiment, when the FFT function provides an output signal which has a usable bandwidth that is smaller than the input signal to which said FFT function is applied, each frequency segment has a bandwidth which is a determined usable bandwidth.

In still another specific embodiment, the method further comprises classifying each channel bandwidth into one of a predefined bandwidth category set.

According to another variant, the method for channel scanning further comprises applying the FFT function to the at least one signal during a certain time interval and registering the maximum power value provided for each sub-channel of the output signal during said interval. Said time interval may be, for example, a WiMAX frame interval.

According to still another aspect of the disclosure, based on said determined channel positions, the method further comprises identifying one channel plan of a plurality of channel plans stored in a wireless communications device.

According to another embodiment, based on said determined channel positions, the method further comprises identifying a channel pattern corresponding to a specific geographical region.

In still another embodiment, for each channel used to attempt to connect with the network, the method for channel scanning comprises correlating the FFT output for each symbol of the input signal to a power pattern corresponding to a WiMAX frame, and using said correlation to estimate the preamble location of the WiMAX frame. According to still another embodiment, said correlation is even used for determining if the channel supports a WiMAX wireless communications standard.

The disclosure also comprises a corresponding wireless communications device adapted to perform channel scanning according to the different embodiments of the disclosure.

The various aspect of the disclosure will be better understood and further advantages will become apparent from the following description of illustrative embodiments. Although the examples used hereunder may be directed to a WiMAX wireless communications standard system, it shall be understood that the method of the disclosure can be applied to other wireless communications standards.

DETAILED DESCRIPTION OF ILLUSTRATIVE EMBODIMENTS

Figure 1:
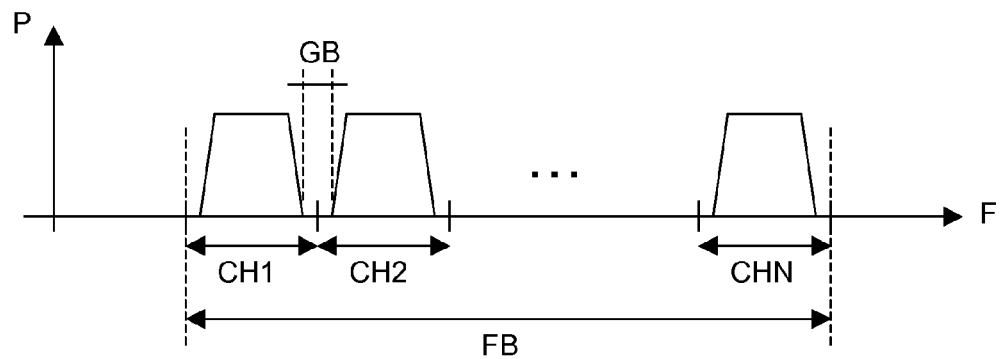
FIG. 1 is a schematic illustration a wireless communications system frequency band comprising multiple channels.

FIG. 1 shows a typical wireless communications system spectrum configuration that is divided in a plurality of frequency bands FB used by certain wireless standards for providing communications service. A wireless standard may have assigned more than one frequency band FB, for example, for a WiMAX communications standard, frequency bands FB located in the 2.3, 2.5 and/or 3.5 GHz range may be used by the wireless communications device.

A frequency band FB is typically divided in a number of communication channels CH1 to CHn which are typically intended for a determined number of wireless devices located in a certain geographical region. This means that depending on the wireless device location and/or the operator providing service in that region, certain channels may be usable while others may not. The wireless system channels CH1 to CHn are required to fit within a spectrum mask that constrains their power envelope, allocating more spectrum that the nominal channel size to provide a separation or guard band GB between channels. Said guard band GB are needed to limit interference between the channels. The specific spectrum mask of the channels can vary between technology, network deployment type and country.

FIG. 2B shows the spectral representation of a signal obtained using a conventional Fast Fourier Transform (FFT) analysis module FFM as shown in FIG. 2A. The input signal OSi may be, for example, an OFDM or OFDMA signal and the FFT function of the FFT module FFM provides a frequency representation signal OSo, illustrated in FIG. 2B, for each OFDM symbol of said input signal OSi.

The FFT function uses the signal samples over an OFDM symbol duration to provide a frequency representation of that symbol. Typically, a WiMAX system uses a 512-point or 1024-point FFT; for a 1024-point FFT, for example, one input OFDM symbol will be represented as 1024 frequency sub-channels. In case, for example, that said FFT function is applied to a signal received through a WiMAX channel of 10 MHz of bandwidth, for each OFDM symbol received, we would obtain a value of the power level of each of the 1024 sub-channels, and each sub-channel having a bandwidth approximately of 9.8 kHz in the frequency domain.

An exemplary and very simplified FFT frequency representation can be viewed in FIG. 2B, which shows the power value P assigned to a plurality of sub-channels S1 to Sn, for a certain symbol of a certain WiMAX channel CHn. When a sub-channel does not carry any information the FFT output value for that sub-channel will correspond to a certain noise floor value N. Depending on the implementation of the FFT module FFM, not all the sub-channel values for a certain channel (e.g. 512 or 1024 sub-channel values) may be provided at the output, for example, since the borders of the channel CHn are used as a guard band GB and no useful signal is present in that region, some implementations will provide only a certain number of sub-channel values and discard the values of the sub-channels located in the guard band region. The actual bandwidth of the output signal OSo of the FFT module FFM is called the usable bandwidth UB and may be equal or smaller than the bandwidth of the input signal OSi, which is generally substantially equal to a channel bandwidth supported by the wireless communications device. For example, in case of a wireless communications device supporting 10 MHz WiMAX channels and a 1024-point FFT, some FFT module FFM implementations will provide just 865 sub-channel output values, which corresponds to a usable bandwidth UB of approximately 8.45 MHz.

Figure 2:
FIG. 2A, B shows the spectral representation of a signal obtained using a conventional FFT conversion module.
Figure 2:
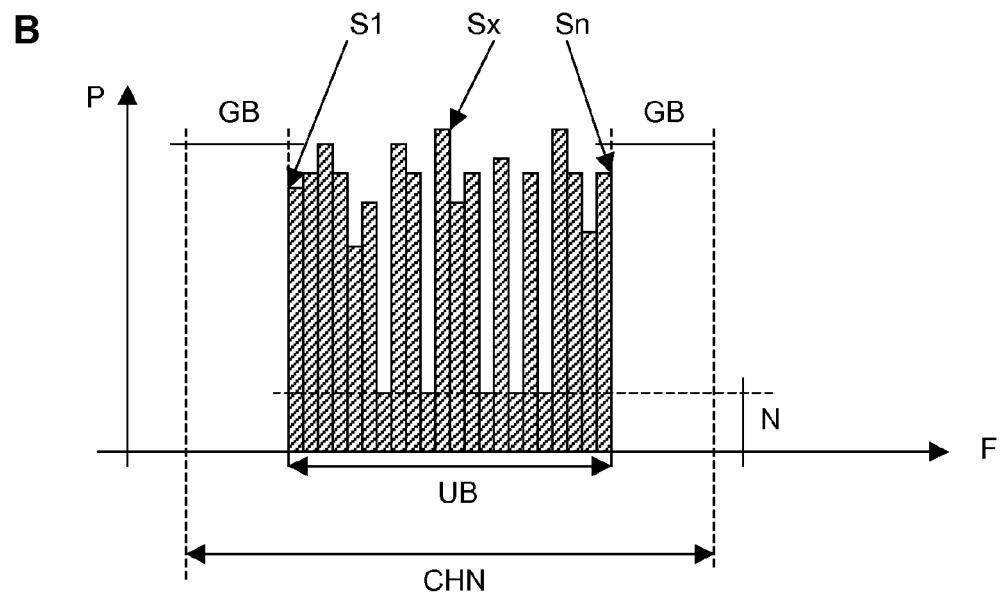

It shall be understood that the FFT module FFM showed in FIG. 2 may also comprise any technique for reducing spectral leakage and/or increase sidelobe rejection of the FFT function, as for example, pre-FFT windowing such as Hanning or rectangular or adaptive windowing.

Figure 3:
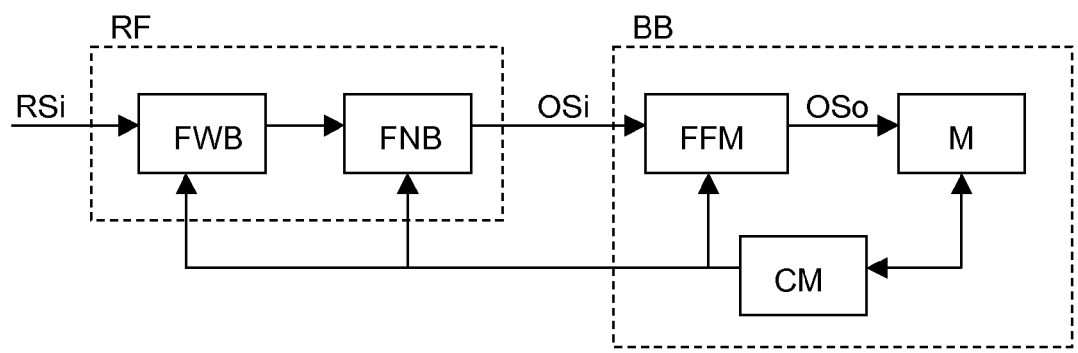
FIG. 3 shows a simplified block diagram of a typical wireless communications device according to an embodiment of the disclosure.

FIG. 3 shows a simplified block diagram of a typical wireless communications device according to an illustrative embodiment of the disclosure comprising an antenna reception signal RSi, a radio frequency block RF with a wide-band filter module FWB and a narrow-band filter module FNB, a broadband block BB with an input signal OSi to a FFT module FFM, an FFT module output signal OSo, a memory module M and a control module CM.

The antenna reception signal RSi goes through the wide-band filter FWB, which is configured for the selection of a particular frequency band (FB in FIG. 1). A specific gain is typically applied at this stage that depends on the power level of the whole frequency band. After that, the wide band signal goes through the narrow-band filter FNB, which is configured for the reception of a certain frequency band segment, e.g. the position of a channel of interest. The bandwidth of the input signal OSi to the FFT module FFM is therefore defined by the narrow-band filter module FNB. A second gain is also typically applied on this input signal OSi, which depends only on the narrow-band signal power level. The FFT module will apply a FFT function to the input signal OSi so that it is converted into a representation of that signal in the frequency domain, which is the output signal OSo. Said output signal OSo, or frequency representation signal, will be then registered in a memory module M for further analysis. A control module CM will be in charge of configuring the wide-band and narrow-band filters FWB, FNB, set a certain FFT-point size for the FFT module FFM and analyze the frequency representation signals registered in the memory module M for performing channel scanning according to an embodiment of the disclosure. It shall be understood that the control functions of the control module CM may be less than the ones in the above-indicated example, for example, in case of wireless communications device implementations in which the either the wide-band filter function, the narrow-band filter function and/or the FFT size cannot be modified or configured.

Figure 4:
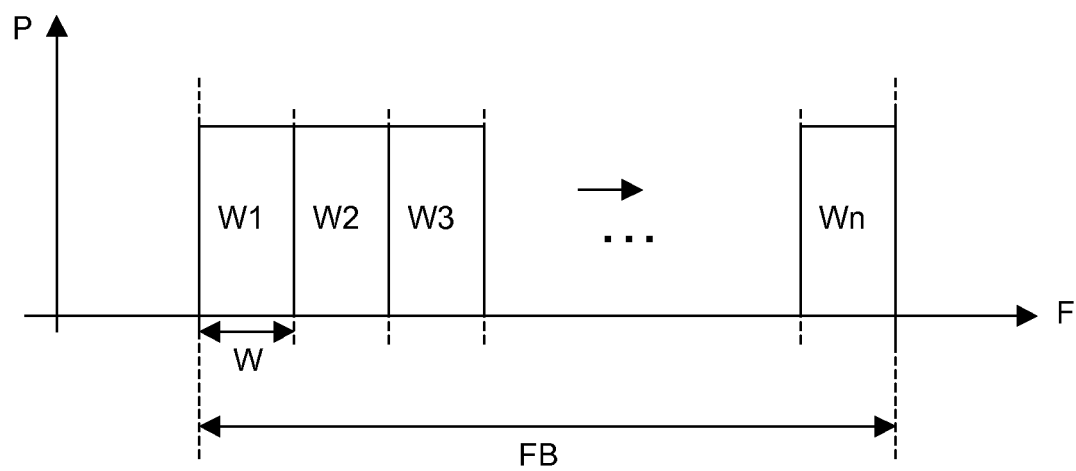
FIG. 4 illustrates the method for spectral analysis of a certain frequency band according to an embodiment of the disclosure.

FIG. 4 illustrates a method for spectral analysis of a particular frequency band FB according to an embodiment of the disclosure. An FFT function is used to perform the spectral analysis of said frequency band FB in order to discover the channels usable for connecting to the network.

In a first step, the wireless device is set to scan a particular frequency band FB, e.g. according to a particular wide-band filter configuration, and after that, the bandwidth of the narrow-band filter FNB is set to a particular value, called capture window bandwidth W. In a next step, the whole frequency band FB is scanned using said capture window bandwidth W, e.g. the narrow-band filter FNB is configured so that input signals OSi of a certain frequency window or segment W1 to Wn are passed to the FFT module FFM in a successive manner. For example, starting from the lowest frequency of the frequency band FB, in a first capture, a FFT is applied to an input signal OSi which has a bandwidth corresponding to a first frequency segment or window W1 and the output of the FFT module FFM is registered, then in a second capture, a FFT is applied to an input signal OSi which has a bandwidth corresponding to a second frequency segment or window W2 and the output of the FFT module FFM is registered, and so forth, making further successive captures until the whole frequency band FB is covered. Therefore, for a given frequency band FB, it becomes possible to cover the whole frequency band with several iterations of such window captures W1 to Wn. It shall be understood that the captures W1 to Wn may be made in any order, e.g. in ascending or descending order or following a different pattern, and some of the window captures may overlap.

The capture window bandwidth W may be advantageously determined to be equal or less than a particular channel bandwidth, for example, in cases where the wireless communications device supports several channel bandwidths, the capture window bandwidth W can be determined to be one of said supported bandwidths. According to a specific embodiment of the disclosure, the usable bandwidth (UB in FIG. 2) of the FFT module FFM is first determined for a certain input signal OSi bandwidth and the bandwidth of the capture window W is set to the same value as said usable bandwidth UB. The capture window bandwidth W may therefore not be equal to a particular channel bandwidth supported by the wireless communications device and the scanned frequency band FB may not be an exact multiple of said capture window bandwidth W. For example, in a wireless communications device supporting several channel bandwidths (e.g. 3, 5 and 10 MHz) and FFT-point sizes (e.g. 512 and 1024-point FFT), said device is configured, according to an embodiment of the disclosure, to apply the maximum supported FFT-point size (1024-point FFT) in the FFT module FFM and to set the capture window bandwidth W to the usable bandwidth UB of the FFT module FMM, said usable bandwidth UB determined when applying an input signal OSi with a bandwidth corresponding to the maximum supported channel bandwidth (10 MHz). As already indicated above, said usable bandwidth UB may be, in the example above, 10 MHz or less than that, e.g. 8.45 MHz. For the latter bandwidth, it becomes possible to cover a certain frequency band of 100 MHz in twelve captures.

Advantageously, according to a specific embodiment of the disclosure, as each capture W1 to Wn may use different gains, the capture power for each window W1 to Wn may be normalized to a common reference value so that the absolute power values obtained in each window can be compared with each other. This normalization can be performed in different ways, for example, by adjusting the frequency (wide) band gain to a certain fixed value and a) for each capture, adjusting the window narrow-band analog gain, and then normalizing the result, or b) using two different fixed narrow band gains for each capture and then normalizing the results. Since each power normalization method is associated with a certain time duration, dependent, for example, in specific combinations of: the time needed to physically adapt the gain of the narrowband filter (GA), the number of measures needed to cover the full dynamic with the fixed gain scheme (N), the number of capture windows used to cover the frequency band or bands (NW), and a capture window duration (D), the actual specific power normalization method to be used will be the one that can be performed in the minimum time. For example, it is possible to determine the duration of the adaptive gain scheme (a) by the formula: $N \times (GA+D)$, and the duration of the fixed gain scheme (b) by the formula: $N \times GA + NW \times D$, and compare both duration values.

Figure 5:
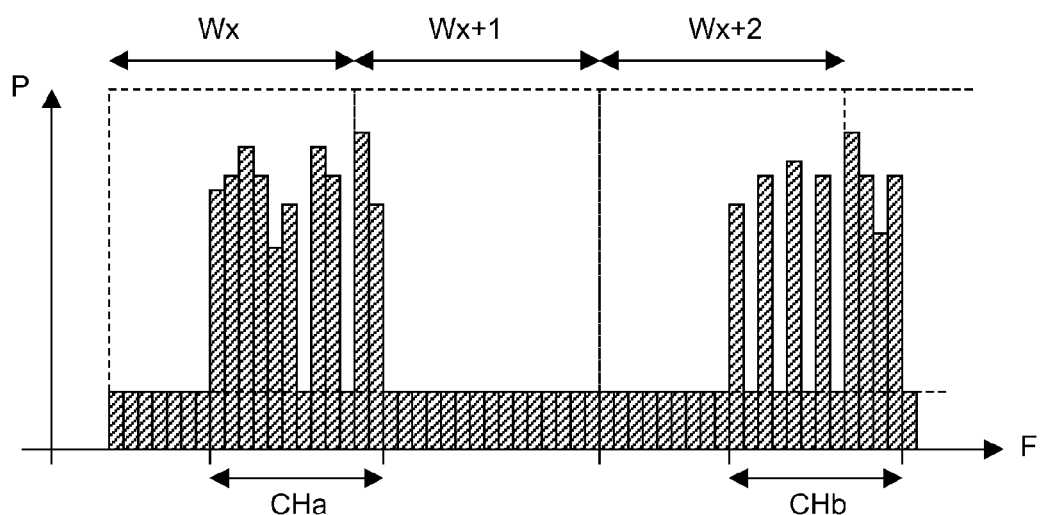
FIG. 5 is an example of the frequency representation of a part of the frequency band when spectral analysis and power normalization is performed according an exemplary embodiment of the disclosure.

Once the spectrums capture, and optionally the power normalization explained above, is finished, an edge detection technique is used to extract, from the resulting representation of the frequency band FB, the positions of used channels. FIG. 5, for example, illustrates a representation of part of the frequency band, and in particular a part of the frequency band covered by three window captures Wx, Wx+1 and Wx+2. The edge detection mechanism will be based on detection of the guard bands GB providing the necessary separation between channels, CHa and CHb in FIG. 5. The algorithm may be adjusted to the used wireless communications standard (e.g. WiMAX, 3GPP LTE etc); for example, in WiMAX, only one sub-channel every three may be used in some cases, and therefore a single unused sub-channel shall not be considered as being the end of a channel. A possible criteria to be used for WiMAX would be, for example, to first determine a certain bandwidth threshold (T) which is higher than the maximum frequency width of two sub-channels and lower than the frequency width of the guard band between two channels, and then determine the spectrums unused frequency space (FS); and depending on the bandwidth of said unused frequency space (FS) compared to the determined threshold (T), determining if said unused frequency space is a guard band, e.g. when FS>T, or an unused frequency space inside a channel, e.g. when FS<T.

Once the used channels have been detected, it is possible to calculate their center frequency and bandwidth with a precision equal to a sub-channel bandwidth size. In a specific embodiment, said information about the detected channel bandwidth is used to classify one or more detected channels into a certain channel bandwidth category, so that an exact bandwidth can be assigned to said one or more channels, for example, when the sub-channel bandwidth is approximately 9.8 kHz (e.g. when the input signal OSi has a bandwidth of 10 MHz and a 1024-point FFT is used), this frequency precision is sufficient for classifying the detected channels into channel bandwidth categories that differ by more than 0.5 MHz (e.g. in one of 3, 5, 7, 8.75 or 10 MHz possible channel bandwidth categories).

By performing the above-indicated channel recognition process according to an embodiment the disclosure, the wireless communications device is able to obtain a list of used channels, their exact bandwidth, their center frequency with a precision of a sub-channel bandwidth size, and their average power. The wireless communications device can then advantageously use this list to start a classical trial and error approach for connecting with the network.

It shall be noted that although the wireless communications device is not synchronized to the network, it can still use its own FFT window capture function at a given frequency and compute the power for each sub-channel for a given OFDM symbol. According to an embodiment of the disclosure, the window capture interval, i.e. the period time the FFT module FFM performs a FFT to the input signal OSi for each window, is set equal or greater than a particular value and the maximum power value for each of the FFT sub-channels is detected and maintained during said capture interval, so as to increase the chances for detecting a used channel. For example, with regard to the WiMAX or IEEE 802.16e standard, the window capture interval may be set to be equal or greater than the WiMAX frame duration (5 ms) and the maximum power value detected for each sub-channel during that interval is kept. In this way it is assured that each capture window detects at least one preamble of a WiMAX frame, which is broadcast by the base station with higher power (4.25 dB higher) than the rest of the data of the frame. Advantageously, not only the channel will be detected but also a better frequency representation is achieved for performing channel edge detection.

Although the method and system according to an illustrative embodiment of the disclosure may be advantageously implemented in wireless communications devices which already contain an FFT module FFM, it can also be applied to radio access technologies which do not require a FFT function in the wireless communications device.

According to another specific embodiment, in a wireless communications device supporting several channel bandwidths (e.g. 3, 5 and 10 MHz) and FFT-point sizes (e.g. 512 and 1024-point FFT), said device is configured to the maximum supported FFT-point size (1024-point FFT) and the minimum supported channel bandwidth (3 MHz) for performing a channel discovery process according to an embodiment of the disclosure. The capture window bandwidth W corresponds to the usable bandwidth UB of the FFT module FMM, which, in this case, will be 3 MHz or less, e.g. 2.54 MHz and the sub-channel bandwidth will correspond to approximately 2.9 kHz. In this way we achieve smaller sub-channel bandwidths and hence a better frequency precision for the estimation of the channel edges and center frequency. Improving the channel center frequency estimation allows reducing the number of frequency hypothesis in the trial and error network connection or synchronization phase.

The method may also be implemented in wireless communications devices which are pre-provisioned or have received a set of channel plans for a certain number of operators.

Performing a quick channel scanning according to an illustrative embodiment of the disclosure is advantageous in said wireless communications devices since the information about the channels detected in a particular frequency band, and particularly the information about their channel center frequencies, can be used to identify one channel plan of the plurality of stored channel plans (e.g. when the wireless communications device is roaming and has a list of the roaming partner's channel plans of its access provider). This avoids performing a trial and error approach for connecting to the network using all the channel plans stored in the wireless communications device and therefore reduces network connection time.

In another embodiment, said information gathered by performing a quick channel scan according may be used to identify a certain geographical area or region, e.g. a certain country. Since some channel plans may be specific to said limited geographical area, the wireless communications device may use the quick channel scanning according to an embodiment of the disclosure to identify any of such specific channel plan patterns and therefore select a channel plan or a list of channel plans of operators authorized to provide wireless communications access in this specific region. The wireless communications device may then use said one or more selected channel plans to carry a conventional trial and error channel search approach.

In another specific implementation, the channel scanning method is used to estimate the location of a preamble or beacon location in the input signal OSi. In certain wireless communications standards, a frame structure is used in the time domain to let the wireless communications device identify the beginning of the frames, for example, in case of a WiMAX wireless communications standard, when the wireless communications device tries to synchronize to a channel for connection with the network, it must find this preamble over a whole frame duration, which is 5 ms. For a 10 MHz WiMAX channel using a 1024-point FFT, the frame has 47 OFDM symbols and the first OFDM symbol is the preamble. This means that the wireless communications device must look for one occurrence among 47 possible positions.

Figure 6:
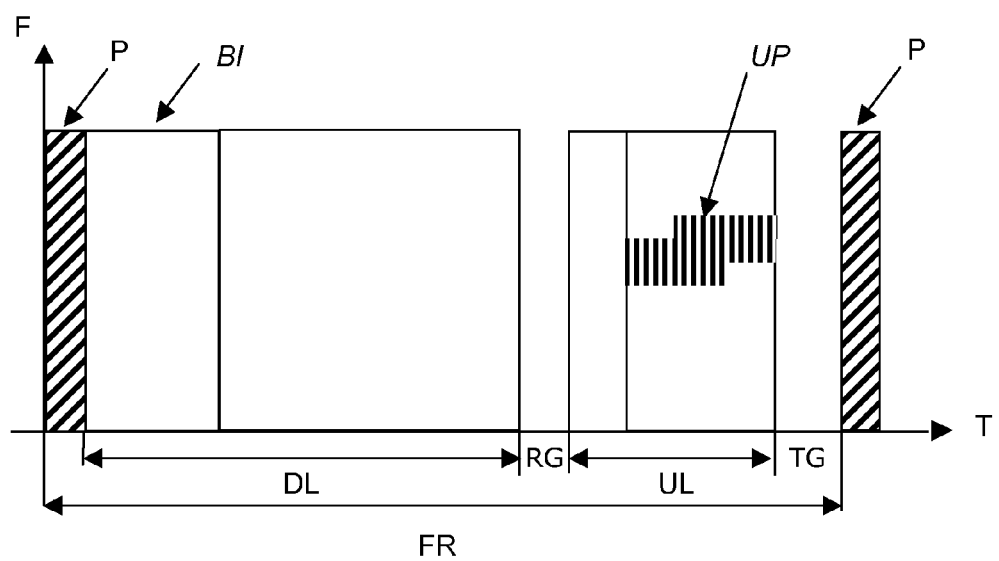
FIG. 6 shows a conventional WiMAX frame structure.

FIG. 6 shows a conventional WiMAX frame structure FR in a TDD set-up, according to a horizontal time axis T and a vertical frequency axis F. The frame comprises a preamble P that is transmitted by the base station with a power of 4.25 dB higher than the rest of the downlink data. A downlink sub-frame DL follows the preamble and starts with broadcasted information BI. The downlink sub-frame is followed by a gap RG before an uplink sub-frame UL and a final frame gap TG.

In terms of power reception from a wireless communications device, the uplink sub-frame UL will typically appear as empty unless another device is transmitting in a near location. Even in the case, the uplink sub-frame allocation has a specific pattern UP that typically does not use all the frequency sub-channels. This allows detecting and filtering out other wireless communications device's transmissions. Even if the uplink sub-frame is full, as seen by the wireless communications device performing a channel scanning according to an embodiment of the disclosure, the final frame gap TG will be seen in the frequency domain as a zone where there is no transmitted power. A preamble P is then the highest power symbol where the power is spread over the whole channel (maybe only using one sub-channel every 3) following a zone with no power corresponding to the final frame gap TG.

According to an embodiment of the disclosure, it is possible to use the frequency representation of the input signal OSi to estimate the position of the preamble P by detecting the sequence of an uplink sub-frame low power zone, followed by a final frame gap TG no power zone, a preamble P with highest power followed by a decrease in power which corresponds to the beginning of a downlink sub-frame DL. A majority vote across the sub-channels of a channel can be done to validate the estimation robustness. When the wireless communications device sees a sufficiently clear pattern in the frequency domain identifying the preamble position of the input signal OSi, it can accelerate the time synchronization part of the trial and error network connection process.

It shall be noted that, in the above example, a channel with power may not be a WiMAX channel, and there will be typically no good match for a preamble location. In such case, the system may deduce with sufficient confidence that the channel does not support a WiMAX wireless standard, and ignore said channel for the trial and error network connection phase.

In view of the drawbacks of the prior art, an illustrative embodiment of the disclosure provides an improved method and system for channel scanning.

Although the present disclosure has been described with reference to one or more examples, workers skilled in the art will recognize that changes may be made in form and detail without departing from the scope of the disclosure and/or the appended claims.

What is claimed is:

1. A method for channel scanning in a wireless communications system, for the identification of one or more narrowband channels present in a certain frequency band and which can be used for connection between a wireless communications device and a communications network, the method comprising:

applying a FFT function to at least one signal corresponding to a given frequency band during a certain time interval, providing an output signal, and registering a maximum power value provided for each sub-channel of the output signal during the time interval;

analyzing said maximum power values with a processing device so as to detect at least one frequency region having at least one predetermined feature, and determining at least one channel position, by considering that each of said at least one frequency region having at least one predetermined feature is a guard band of one of said at least one channel.

2. The method for channel scanning of claim 1, wherein the wireless communications device performs a network connection attempt for at least one channel identified in said frequency band.

3. The method for channel scanning of claim 1, wherein the frequency band is divided into a plurality of frequency segments and the FFT function is applied to a plurality of input signals, each input signal having a bandwidth corresponding to one of said frequency segments.

4. The method for channel scanning of claim 1, further comprising normalizing the power values provided by the FFT function to a common reference.

5. The method for channel scanning of claim 1, wherein, based on said determined guard bands, determining bandwidth and a center frequency for each determined channel position.

6. The method for channel scanning of claim 3, wherein the FFT function provides the output signal which has a usable bandwidth smaller than the input signal to which said FFT function is applied, and wherein each frequency segment has a bandwidth which is a determined usable bandwidth.

7. The method for channel scanning of claim 1, the method further comprising classifying each channel bandwidth into one of a predefined bandwidth category set.

8. The method for channel scanning of claim 1, further comprising, based on said determined channel positions, identifying one channel plan of a plurality of channel plans stored in the wireless communications device.

9. The method for channel scanning of claim 1, further comprising, based on said determined channel positions, identifying a channel pattern corresponding to a specific geographical region.

10. The method for channel scanning of claim 1, wherein the time interval is a WiMAX frame interval.

11. The method for channel scanning of claim 1, wherein the time interval is a WiMAX frame interval, and wherein for each channel used to attempt to connect with the network, correlating the FFT output for each symbol of the input signal to a power pattern corresponding to the WiMAX frame, and using said correlation to estimate the preamble location of the WiMAX frame.

12. The method for channel scanning of claim 1, wherein the time interval is a WiMAX frame interval, and wherein for each channel used to attempt to connect with the network, correlating the FFT output for each symbol of the input signal to a power pattern corresponding to the WiMAX frame, and using said correlation to estimate the preamble location of the WiMAX frame, and wherein said correlation is used for determining if the channel supports a WiMAX wireless communications standard.

13. A non-transitory computer readable medium comprising a program product stored thereon and executable by a processor, the program product comprising program instructions for implementing a method for channel scanning in a wireless communications system, for the identification of one or more narrow-band channels present in a certain frequency band and which can be used for connection between a wireless communications device and a communications network, wherein the program instructions comprise:
 instructions configured to apply a FFT function to at least one signal corresponding to a given frequency band during a certain time interval, providing an output signal, and registering a maximum power value provided for each sub-channel of the output signal during the time interval;
 instructions configured to analyze said power values so as to detect at least one frequency region having at least one predetermined feature, and
 instructions configured to determine at least one channel position, by considering that each of said at least one frequency region having at least one predetermined feature is a guard band of one of said at least one channel.

14. A wireless communications device comprising:
 means adapted for identification of one or more narrow-band channels present in a certain frequency band and which can be used for connection between a wireless communications device and a communications network and comprising means adapted for:
  applying a FFT function to at least one signal corresponding to a given frequency band during a certain time interval, providing an output signal, and registering a maximum power value provided for each sub-channel of the output signal during the time interval, and
  analyzing said power values so as to detect at least one frequency region having at least one predetermined feature; and
 means adapted for determining at least one channel position, by considering that each of said at least one frequency region having at least one predetermined feature is a guard band of one of said at least one channel.

* * * * *